UNITED STATES PATENT OFFICE.

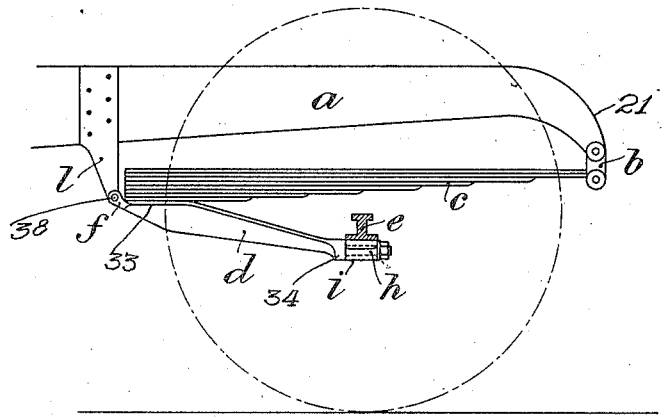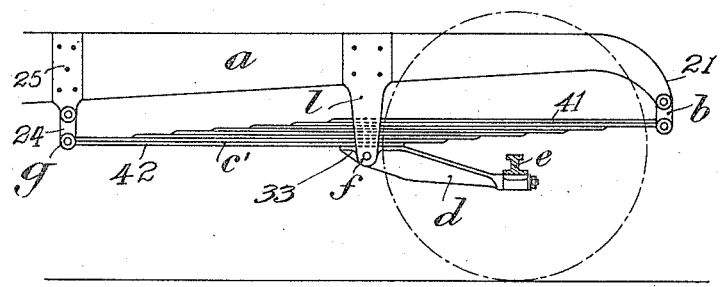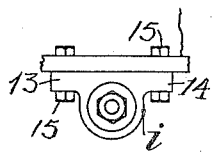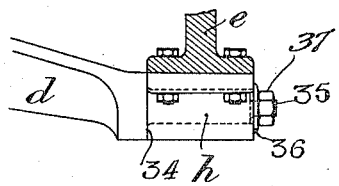

AXEL JULIUS LAURITS LASSEN, OF COPENHAGEN, DENMARK.

SPRING SUPPORTING DEVICE FOR VEHICLES.

1,226,225.

Specification of Letters Patent.

Patented May 15, 1917.

Application filed April 29, 1915. Serial No. 24,656.

*To all whom it may concern:*

Be it known that I, AXEL JULIUS LAURITS LASSEN, a citizen of the Kingdom of Denmark, residing at No. 5 Aaboulevard, Copenhagen, Denmark, have invented certain new and useful Improvements in Spring Supporting Devices for Vehicles, of which the following is a specification.

The object of the invention is to provide a spring support sufficiently sensitive to yield readily to small irregularities of the road and sufficiently rigid under large irregularities thereof to render an automobile comfortable without the use of pneumatic tires, whereby the cost of such tires and the expense and annoyance incident to puncture thereof may be avoided.

Figure 1 of the accompanying drawings represents an elevation of one side of the front portion of an automobile frame, a transverse section of one of the axles, and a spring support disposed between said parts and embodying one form of this invention.

Fig. 2 represents a view similar to Fig. 1, showing another embodiment of the invention.

Fig. 3 represents on a larger scale the connection with one of the axles of a lever constituting a part of one of these spring support-devices, the axle being in cross-section, and a stud box attached thereto being partly broken away to facilitate illustration.

Fig. 4 represents on the same scale as Fig. 3 a rear elevation of a fragment of the axle and the connection therewith of said spring supporting lever.

The same reference characters indicate corresponding parts in the different figures.

This description and the drawings set forth a single embodiment of the invention adapted to support one corner of the vehicle body from one of the axles, it being understood that four of such spring supports will be employed, two in connection with the front axle and two in connection with the rear axle.

The particular embodiment shown in Fig. 1 comprises an axle $e$, a main frame $a$, a spring supporting lever $d$ projecting from said axle lengthwise of the vehicle and having a rigid connection with said axle and a flexible connection by pivot with the frame, and a leaf spring $c$ disposed lengthwise of the vehicle between the body and the axle, said spring being fixed at one end to said lever near the outer end thereof and connected at its opposite ends to said frame.

The axle $e$ is provided with a transverse stud hole or bearing, which is preferably embodied in a stud box $i$. This stud box is provided with attaching flanges 13 and 14 and is secured to the axle transversely thereof by means of bolts 15, preferably to the underside of said axle.

The fragment herein shown of the main frame $a$ comprises one of the front horns thereof. This horn is provided at its front end with a downward nose 21 and a pivoted dependent link $b$ hangs from said nose. This link is in a horizontal plane above the axle and in a vertical plane in front thereof. A fixed bracket $l$ depends from the frame $a$ at a point in rear of the axle $c$.

The spring supporting lever $d$ has a lengthwise stud $h$ at its front end, ears $f$ at its rear end and a horizontal plate or shelf 33 adjacent to its elevated rear end. The body of the lever is preferably inclined upward from said stud to said plate. The stud $h$ is adapted to fit the bore of the stud box $i$ and a shoulder 34 at the base of the stud $h$ engages one end of the stud box as shown in Fig. 4. The stud $h$ is provided at its outer end with a threaded end 35 which projects outside the stud box and a washer 36 and a nut 37 are disposed thereon and serve to clamp the lever $d$ to the axle. This stud-and-box device forms a rigid connection between the axle and the lever. The lever $d$ has a pivotal connection at its opposite end with the lower end of the dependent bracket $l$ by means of a pintle 38 which passes through the ears $f$ of the lever and through the holes in said bracket, or by other suitable means.

The leaf spring $c$ is preferably composed of a series of steel plates of graduated lengths, the inner ends thereof overlapping at the center of the spring so as to form a series of upward steps toward the outer end thereof. The thick portion of the spring thus formed, comprising all the leaves thereof, is fastened on the shelf 33 of the lever $d$ and the opposite thin ends of the spring are flexibly connected to the frame $a$. This connection is made in the illustrated embodiment by means of the link $b$ connecting the outer end of the spring $c$ with the nose 21 of the frame $a$. The spring is thus suspended in the space between the axle and the frame and supported on the shelf 33 adjacent to the elevated inner end of the lever some distance in rear of the front axle or in front of the rear axle as the case may be.

Another embodiment is shown in Fig. 2. In this case the frame or horn *a* thereof is provided with an additional bracket 25 which depends from said frame at a point in the rear of the bracket *l*.

The leaf spring *c'* is also disposed lengthwise of the vehicle between the body and the axle, is fixed centrally of its length to the lever *d* and at its opposite ends flexibly to the frame. This spring *c'* is preferably composed of a series of steel plates of about the same length, the inner ends of the outermost leaves 41 and 42 overlapping at the center of the spring and the intermediate leaves being so disposed between them as to form a series of downward steps extending from the central portion of the spring toward one end thereof and a series of upward steps toward the opposite end thereof. The thick central portion of the spring thus formed, comprising all the leaves thereof, is fastened on the shelf 33 of the lever *d* and the opposite thin ends of the spring are connected to the links *b* and 24 attached to the nose 21 and the bracket 25 respectively.

These spring supports are sensitive to slight inequalities in the road and sufficiently rigid to avoid bouncing when large inequalities are encountered. The thin flexible outer ends of the springs yield readily when the wheels run over small obstacles in the road. When they run over large obstacles or inequalities the lifting of the axle caused thereby operates to swing the spring supporting lever *d* on its pivotal connection with the frame. This upward swinging of the lever *d* bends, or imparts a bending stress to the spring *c* or *c'* and the resistance of the spring to such bending has a stiffening effect and so far as results are concerned practically shortens the spring. In the embodiment shown in Fig. 2 the bending stress is exerted in opposite directions, upward on one side of the fixed connection of the spring with said lever and downward on the other side thereof. This construction increases the scope and flexibility of the spring.

I claim—

1. A spring support for a vehicle comprising an axle, a frame, a longitudinal lever having a stiff connection with said axle and a pivotal connection with said frame, and a longitudinal leaf spring disposed between said axle and said frame and having a pivotal connection with said frame and a rigid connection with said lever at a point between its said connections.

2. A spring support for a vehicle comprising an axle, a frame, a longitudinal lever having a stiff connection with said axle and a pivotal connection with said frame, and a longitudinal leaf spring disposed between said axle and said frame and having a pivotal connection with said frame and a rigid connection with said lever at a point adjacent to its connection with said frame.

3. A spring support for a vehicle comprising an axle, a frame, a longitudinal lever provided at one end with a longitudinal stud supported in a transverse bearing of said axle and at its other end with a pivotal connection with said frame, and a longitudinal leaf spring disposed between said axle and said frame and having a pivotal connection with said frame and a rigid connection with said lever at a point between its said connections.

4. A spring support for a vehicle comprising an axle, a frame, a longitudinal lever having a stiff connection with said axle and a pivotal connection with said frame, and a longitudinal leaf spring having a pivotal connection with said frame and a rigid connection with said lever at a point between its said connections, said pivotal connections being disposed one in advance of said axle and the other in rear thereof.

5. A spring support for a vehicle comprising an axle, a frame having a dependent projection forward of said axle and a dependent projection in rear thereof, a lever having a stiff connection with said axle and a pivotal connection with one of said dependent projections, and a leaf spring having a pivotal connection with the other dependent projection and a rigid connection with said lever between its said connections.

6. A spring support for a vehicle comprising an axle, a frame, a longitudinal lever having a stiff connection with said axle and a pivotal connection with said frame, and a longitudinal leaf spring composed of a series of leaves of different lengths, the shorter leaves being underneath the longer ones, said spring having a pivotal connection at one end of its longer leaf with said frame and a rigid connection at the opposite end of its shorter leaf with said lever at a point between its said connections.

7. A spring support for a vehicle comprising an axle, a frame, a longitudinal lever having a stiff connection with said axle and a pivotal connection with said frame, said lever being inclined upward from said axle and having an elevated shelf adjacent to said pivotal connection, and a longitudinal leaf spring disposed between said axle and frame and having a flexible connection with said frame and a rigid connection with said lever at the shelf thereof.

8. A spring support for a vehicle comprising an axle, a frame, a lever having a rigid connection with said axle and a pivotal connection with said frame, said lever being disposed lengthwise of the vehicle and inclined upward from said axle, and a longitudinal leaf spring having a flexible connection with said frame and a rigid supporting connection with said lever at a point above the plane of said axle and at a substantial distance from said axle, said lever being operative under a lifting action of said axle to impart a bending stress to said spring.

9. A spring support for a vehicle comprising an axle, a frame, a lever having a rigid connection with said axle and a pivotal connection with said frame, said lever being disposed lengthwise of the vehicle and inclined upward from said axle, and a longitudinal leaf spring having a flexible connection with said frame and a rigid supporting connection with said lever at a point above the plane of said axle and at a substantial distance from said axle, said leaf spring being composed of a series of leaves superposed and forming a thick end at the point of connection with said lever and stepped thence toward the thin end which is connected with said frame, said lever being operative under a lifting action of said axle to impart to said spring a bending stress.

In testimony that I claim the foregoing as my invention, I have signed my name in presence of two subscribing witnesses.

AXEL JULIUS LAURITS LASSEN.

Witnesses:
  ERNEST BOUTARD,
  P. HOFMAN BENG.